(12) United States Patent
Lee

(10) Patent No.: US 8,982,032 B2
(45) Date of Patent: Mar. 17, 2015

(54) DISPLAY DEVICE WITH INTEGRATED TOUCH SCREEN INCLUDING PULL-UP AND PULL-DOWN TRANSISTORS AND METHOD OF DRIVING THE SAME

(71) Applicant: LG Display Co., Ltd., Seoul (KR)

(72) Inventor: Young-Joon Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 175 days.

(21) Appl. No.: 13/692,629

(22) Filed: Dec. 3, 2012

(65) Prior Publication Data

US 2014/0015770 A1 Jan. 16, 2014

(30) Foreign Application Priority Data

Jul. 12, 2012 (KR) .......................... 10-2012-0075945

(51) Int. Cl.
*G09G 3/36* (2006.01)
*G06F 3/041* (2006.01)

(52) U.S. Cl.
CPC ...................................... *G06F 3/041* (2013.01)
USPC ............... 345/98; 345/99; 345/100; 345/173

(58) Field of Classification Search
CPC ...................................................... G06F 3/041

USPC ............................................. 345/173, 98–100
See application file for complete search history.

(56) References Cited

U.S. PATENT DOCUMENTS

| 2006/0145999 | A1* | 7/2006 | Cho et al. ...................... 345/100 |
| 2008/0122804 | A1* | 5/2008 | Kinoshita et al. ............. 345/175 |
| 2010/0156858 | A1* | 6/2010 | Moon et al. ................... 345/204 |
| 2011/0074711 | A1* | 3/2011 | Lee et al. ...................... 345/173 |

* cited by examiner

*Primary Examiner* — Long D Pham
(74) *Attorney, Agent, or Firm* — Brinks Gilson & Lione

(57) ABSTRACT

A display device with an integrated touch screen and a method of driving the same are provided. The display device with an integrated touch screen includes a gate driver that is configured with a plurality of stages that include a pull-up transistor and first and second pull-down transistors and are respectively connected to a plurality of gate lines. The method includes: turning on the pull-up transistor to output a pull-up signal to each of the plurality of gate lines and, after the pull-up signal is outputted, turning on the first pull-down transistor to output a pull-down signal to each of the plurality of gate lines, during an image output period in each frame; and turning on the second pull-down transistor to output the pull-down signal to each of the plurality of gate lines, during a touch sensing period in each frame.

18 Claims, 5 Drawing Sheets

DISPLAY DEVICE WITH INTEGRATED TOUCH SCREEN INCLUDING PULL-UP AND PULL-DOWN TRANSISTORS AND METHOD OF DRIVING THE SAME

CROSS-REFERENCE TO RELATED APPLICATION

The present application claims the priority benefit of Korean Patent Application No. 10-2012-0075945 filed in the Republic of Korea on Jul. 12, 2012, entitled "Display Device With An Integrated Touch Screen And Method Of Driving The Same," which is hereby incorporated by reference in its entirety.

BACKGROUND

1. Field of the Disclosure

The present disclosure relates to a display device, and more particularly, to a display device with an integrated touch screen and a method of driving the same.

2. Discussion of the Related Art

Recently, the demand for display devices with an integrated in-cell type touch screen, which include a plurality of built-in elements configuring the touch screen for slimming portable terminals such as smart phones and tablet personal computers (PCs), is increasing.

In a related art display device with an integrated in-cell type touch screen, a plurality of common electrodes for display are segmented into a plurality of touch driving areas and touch sensing areas, thereby allowing a mutual capacitance to be generated between the touch driving area and the touch sensing area. Therefore, the related art display device measures the change of a mutual capacitance that occurs in touch, and thus determines whether there is a touch.

In a related art in-cell type mutual capacitive touch screen using the existing common electrodes, a scheme that uses a plurality of driving electrodes and sensing electrodes necessary for touch driving temporally separates a display driving mode session and a touch driving mode session by using a common electrode, and thus prevents a noise ingredient (which occurs in the display driving mode session) from affecting the touch driving.

When a gate driver for an in-cell type mutual capacitive touch screen using the existing common electrode is provided in a gate-in-panel (GIP) structure, two pull-down transistors are used for applying a gate low voltage (VGL) to a gate electrode during a touch driving mode and most of a display driving mode.

The two pull-down transistors are configured with different transistor elements, and alternately operate in units of a multiple of a frame. A time, at which the two pull-down transistors start the alternation of operations, is a time at which display is started, and moreover, a time at which the two pull-down transistors start the alternation of next operations is a time at which display is started after a certain frame. Therefore, in a certain frame, when one pull-down transistor operates during the display driving mode, the same pull-down transistor also operates during a touch driving mode that is performed later, and the two pull-down transistors alternately operate in units of a multiple of a frame during the touch driving mode.

However, the two pull-down transistors alternately operate during the touch driving mode, and, due to characteristic differences between elements, the two pull-down transistors affect the amount of electrical charges that are generated between a gate electrode and a sensing electrode, causing the shaking of a touch signal.

SUMMARY

In an embodiment, a display device with an integrated touch screen includes: a panel including a built-in touch screen; a gate driver provided in the panel, and including a plurality of stages that includes a pull-up transistor and first and second pull-down transistors and are respectively connected to a plurality of gate lines, the gate driver sequentially outputting a pull-up signal to the plurality of gate lines during an image output period in each frame; a touch sensing unit driving the touch screen to determine whether there is a touch, during a touch sensing period in each frame; and a display driver outputting first and second driving voltages for controlling an output of the gate driver, wherein, during the image output period, each of the stages turns on the pull-up transistor to output the pull-up signal to a corresponding one of the plurality of gate lines and, after the pull-up signal is outputted, turns on the first pull-down transistor to output a pull-down signal to each of the plurality of gate lines with the first driving voltage, and during the touch sensing period, each stage turns on the second pull-down transistor to output the pull-down signal to a corresponding one of the plurality of gate lines with the second driving voltage.

In another embodiment, a method of driving a display device with an integrated touch screen including a gate driver, which is configured with a plurality of stages that include a pull-up transistor and first and second pull-down transistors and are respectively connected to a plurality of gate lines, the method includes: turning on the pull-up transistor to output a pull-up signal to each of the plurality of gate lines and, after the pull-up signal is outputted, turning on the first pull-down transistor to output a pull-down signal to each of the plurality of gate lines, during an image output period in each frame; and turning on the second pull-down transistor to output the pull-down signal to each of the plurality of gate lines, during a touch sensing period in each frame.

It is to be understood that both the foregoing general description and the following detailed description are exemplary and explanatory.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE PREFERRED EMBODIMENTS

The present disclosure is directed to a display device with an integrated touch screen and a method of driving the same that substantially obviate one or more of the problems due to limitations and disadvantages of the related art.

An object of the present disclosure is to provide a display device with an integrated touch screen and a method of driving the same that can reduce the shaking of a touch signal due to characteristic differences between pull-down transistors.

Additional features and advantages of the disclosure will be set forth in the description which follows, and in part will be apparent from the description, or may be learned by practice of the disclosure. The objectives and other advantages of the disclosure will be realized and attained by the structure particularly pointed out in the written description and claims hereof as well as the appended drawings.

Hereinafter, embodiments of the present disclosure will be described in detail with reference to the accompanying drawings.

In the following description, for convenience of description, a display device with an integrated touch screen according to embodiments of the present disclosure will be exemplarily described as being a liquid crystal display (LCD) device, but the present disclosure is not limited thereto. The present disclosure may be applied to various display devices such as field emission displays (FEDs), plasma display panels (PDPs), electroluminescent displays (ELDs), and electrophoretic displays (EPDs).

Figure 1:
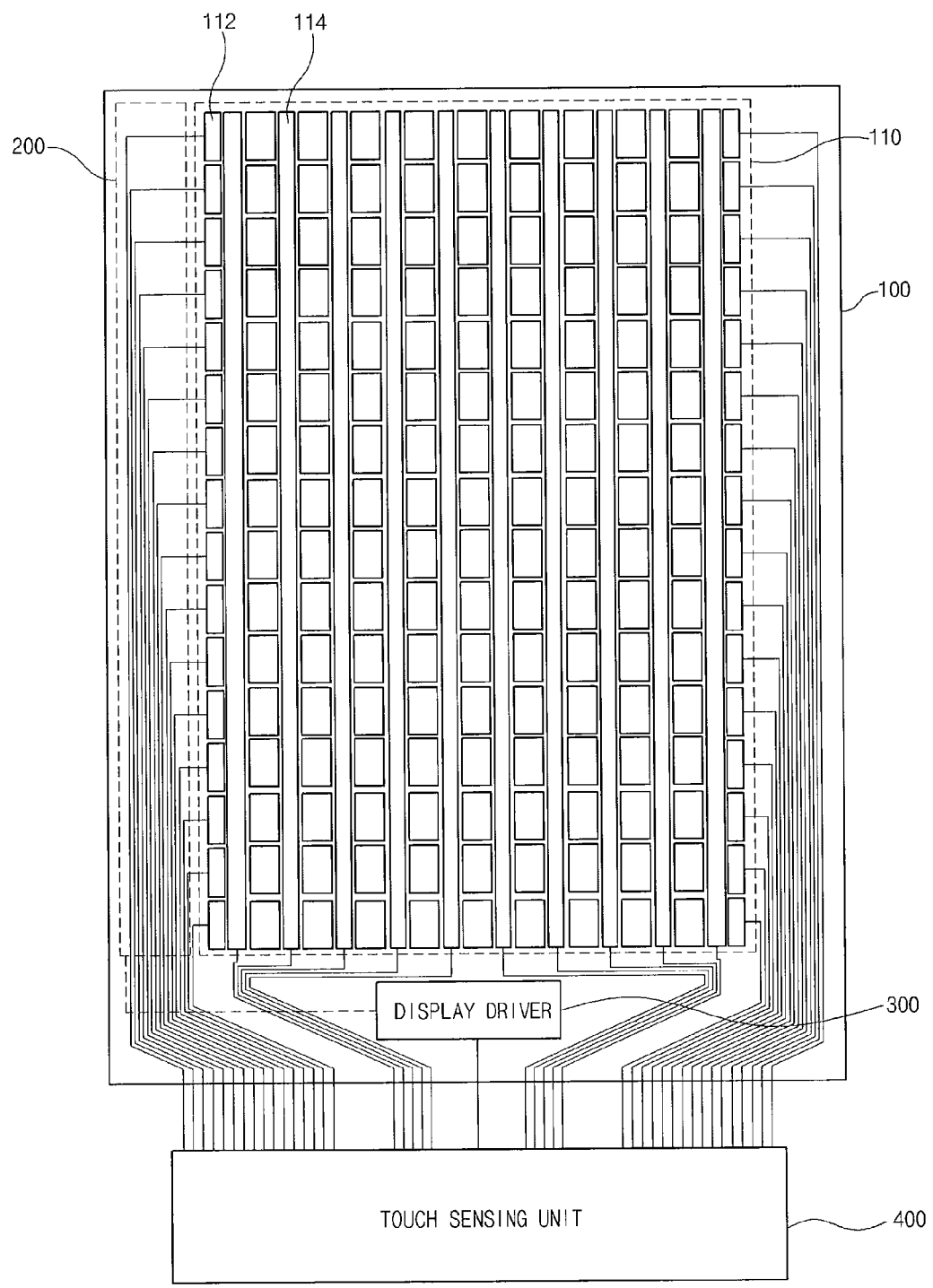
FIG. 1 is a diagram schematically illustrating an example configuration of a display device with an integrated touch screen according to embodiments of the present disclosure.
Figure 2:
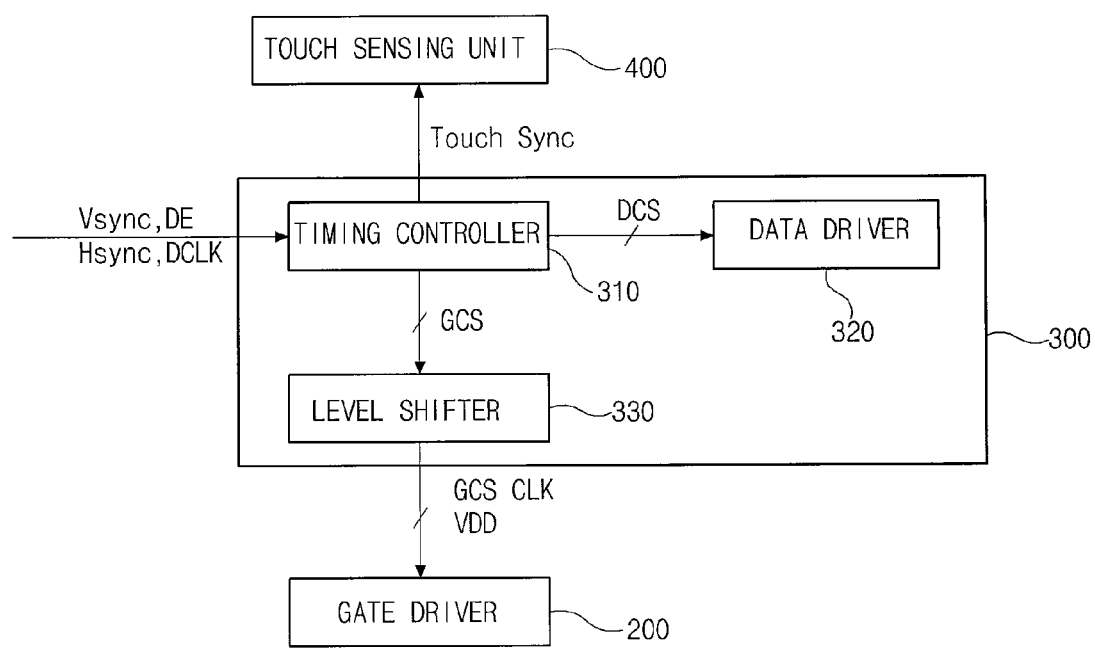
FIG. 2 is a diagram schematically illustrating an example configuration of a display driver of FIG. 1.

FIG. 1 is a diagram schematically illustrating a configuration of a display device with an integrated touch screen according to embodiments of the present disclosure. FIG. 2 is a diagram schematically illustrating a configuration of a display driver of FIG. 1.

As illustrated in FIG. 1, the display device with an integrated touch screen includes a panel 100, a gate driver 200, a display driver 300, and a touch sensing unit 400.

The panel 100 includes a thin film transistor (TFT) substrate in which a plurality of pixels are respectively formed in a plurality of areas that are defined by the intersection of a plurality of data lines and gate lines, and a color filter substrate in which a plurality of color filters are formed. A touch screen 110 is built in the panel 100, and includes a plurality of driving electrodes 112 and a plurality of sensing electrodes 114.

For example, the driving electrodes 112 and the sensing electrodes 114 may perform the function of a common electrode when the display device with an integrated touch screen is driven in a display mode. When the display device is driven in a touch mode, the driving electrodes 112 may perform the function of a touch driving electrode, and the sensing electrodes 114 may perform the function of a touch sensing electrode.

In other words, the driving electrode and sensing electrode of the display device with an integrated touch screen according to embodiments of the present disclosure may perform both a display function and a touch function.

For example, the driving electrodes 112 may be formed in parallel in a width direction that is the direction of a gate line (not shown) in the panel 100. Each of the sensing electrodes 114 may be disposed between adjacent sub driving electrodes among a plurality of sub driving electrodes, and formed in parallel in a height direction that is the direction of a data line (not shown) in the panel 100.

Each of the driving electrodes 112 may be formed as a plurality of block-type common electrodes that are formed to be overlapped with a plurality of unit pixel areas, and each of the sensing electrodes 114 may be formed as one block-type common electrode that is formed to be overlapped with the unit pixel areas.

The driving electrodes 112 and the sensing electrodes 114 need to act as common electrodes for driving liquid crystal, and thus may be formed of a transparent material such as indium tin oxide (ITO).

To control a plurality of switching transistors connected to each of the gate lines, the gate driver 200 sequentially outputs a scan signal, whose maximum value and minimum value respectively are a gate high voltage (VGH) and a gate low voltage (VGL), to each of the gate lines.

In an embodiment, the gate driver 200 may be provided in a GIP structure, in the panel 100. Also, the gate driver 200 includes a plurality of stages respectively connected to the gate lines, and each of the stages includes a pull-up transistor, and first and second pull-down transistors. A detailed description on the gate driver 200 will be made below with reference to FIGS. 3 and 4.

To control the output of an image, the display driver 300 controls the operation of the gate driver 200, and supplies data signals to the data lines connected to the respective sources of the switching transistors.

In an embodiment, the display driver 300 may supply a gate control signal GCS and a gate clock CLK for controlling the gate driver 200, and various driving voltages VDD (which are used in the gate driver 200) to the gate driver 200. Here, the driving voltages VDD may include a first driving voltage VDD1 and a second driving voltage VDD2 to be described in FIGS. 4 and 5.

The display driver 300 generates and outputs a touch synchronous signal "Touch Sync" for controlling the touch sensing unit 400. Here, the various driving voltages VDD may be used to control the respective voltages of nodes Q and QB in each stage included in the gate driver 200 to be described below.

To this end, as illustrated in FIG. 2, the display driver 300 includes a timing controller 310, a data driver 320, and a level shifter 330.

The timing controller 310 aligns external input video signals in units of a frame to generate digital image data RGB, and generates a data control signal DCS, which is used for supplying voltages corresponding to the image data to the data lines, on the basis of a timing synchronous signal including a vertical synchronous signal Vsync and a horizontal synchronous signal Hsync, thereby outputting the data control signal DCS to the data driver 320.

For example, the timing synchronous signal may include the vertical synchronous signal Vsync, a data enable signal DE, and a dot clock DCLK. The data control signal DCS may include a source start pulse SSP, a source sampling clock SSC, a source output enable signal SOE, and a polarity control signal POL.

The timing controller 310 generates the gate control signal GCS for controlling the switching transistors, and supplies the gate control signal GCS to the gate driver 200 via the level shifter 330.

The level shifter 330 converts a driving clock, outputted from the timing controller 310, into the gate clock CLK having a swing width suitable for driving of the switching transistors, and supplies the gate clock CLK to the gate driver 200. Also, the level shifter 330 outputs the various driving voltages VDD1 and VDD2, which are used for controlling the operations of the pull-up transistor and first and second pull-down transistors included in each stage of the gate driver 200, to the gate driver 200.

For example, the gate control signal GCS may include a gate start pulse GSP that is a start signal which allows the gate driver 200 to start driving. Also, the gate clock CLK may be output as a pull-up signal from each stage of the gate driver 200.

In an embodiment, the display driver 300 may be implemented as a display driver IC (DDI) that is one chip including the timing controller 310, the data driver 320, and the level shifter 330.

Referring again to FIG. 1, the touch sensing unit 400 applies a plurality of touch driving voltages to the respective driving electrodes 112 to drive the touch screen 110 according to the touch synchronous signal "Touch Sync," and receives a plurality of sensing signals from the respective sensing electrodes 114 to determine whether there is a touch.

Hereinafter, the gate driver 200 will be described in detail with reference to FIGS. 3 and 4.

Figure 3:
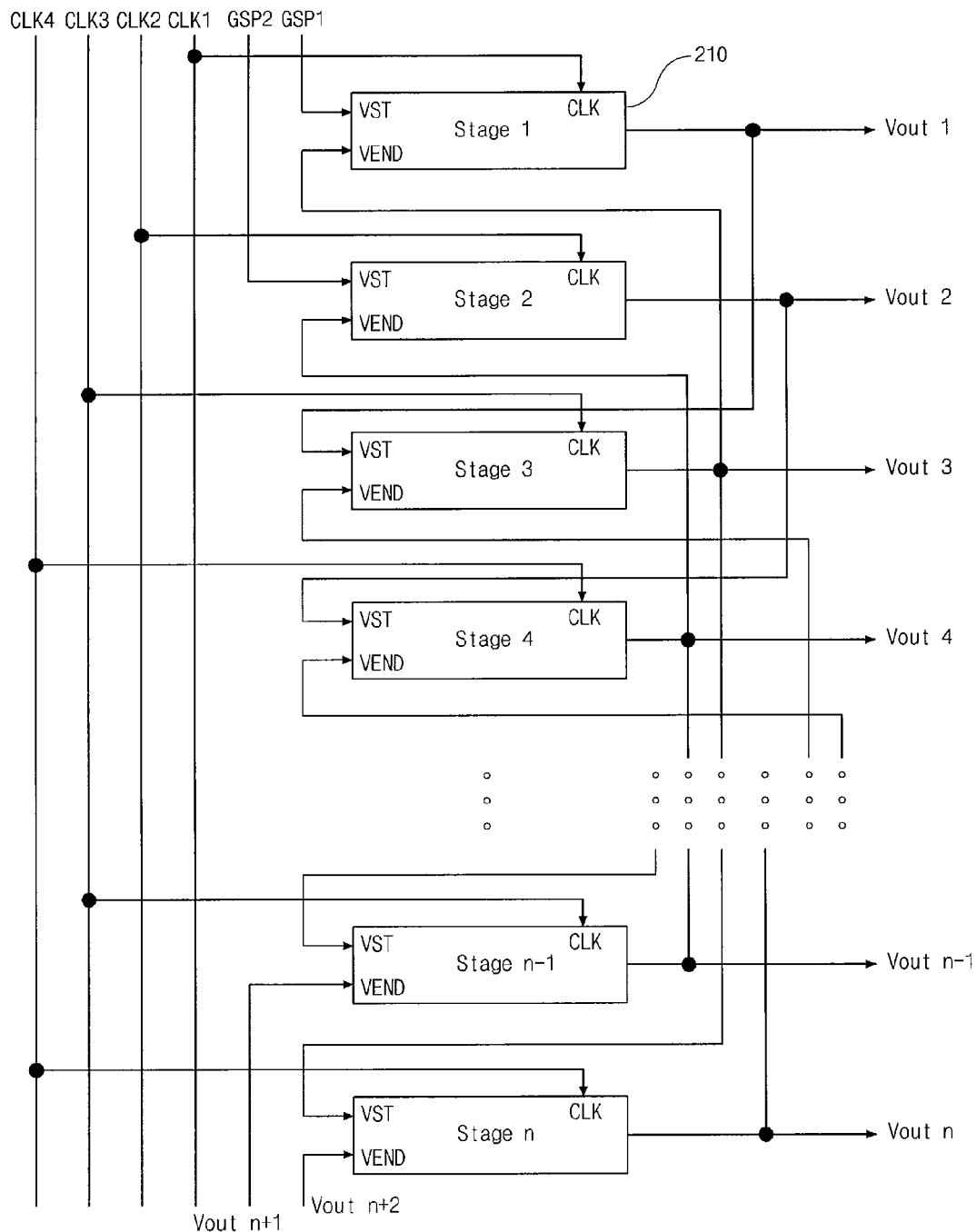
FIG. 3 is a diagram schematically illustrating an example configuration of each of a plurality of stages included in a gate driver of FIG. 2.

FIG. 3 is a diagram schematically illustrating a configuration of each stage included in the gate driver of FIG. 2. FIG. 4 is a diagram illustrating a detailed configuration of each stage of FIG. 3.

As illustrated in FIG. 3, the gate driver 200 includes a plurality of stages 210 (Stage 1 to Stage n) for sequentially applying the scan signals to the respective gate lines. The stages 210 sequentially output a plurality of output signals (Vout 1 to Vout n) in response to the output of a previous stage, the output of a next stage, and a corresponding clock among a plurality of gate clocks CLK1 to CLK4. Here, each of the output signals (Vout 1 to Vout n) is the scan signal for control the switching transistors connected to each of the gate lines.

In FIG. 3, the gate driver 200 is illustrated as using the output of a previous stage, the output of a next stage, and four gate clocks, but is not limited thereto. As another example, the gate driver 200 may include stages having various structures that use one output of previous and next stages, two gate clocks, and four gate clocks, or use three outputs from previous and next stages, and six gate clocks.

Figure 4:
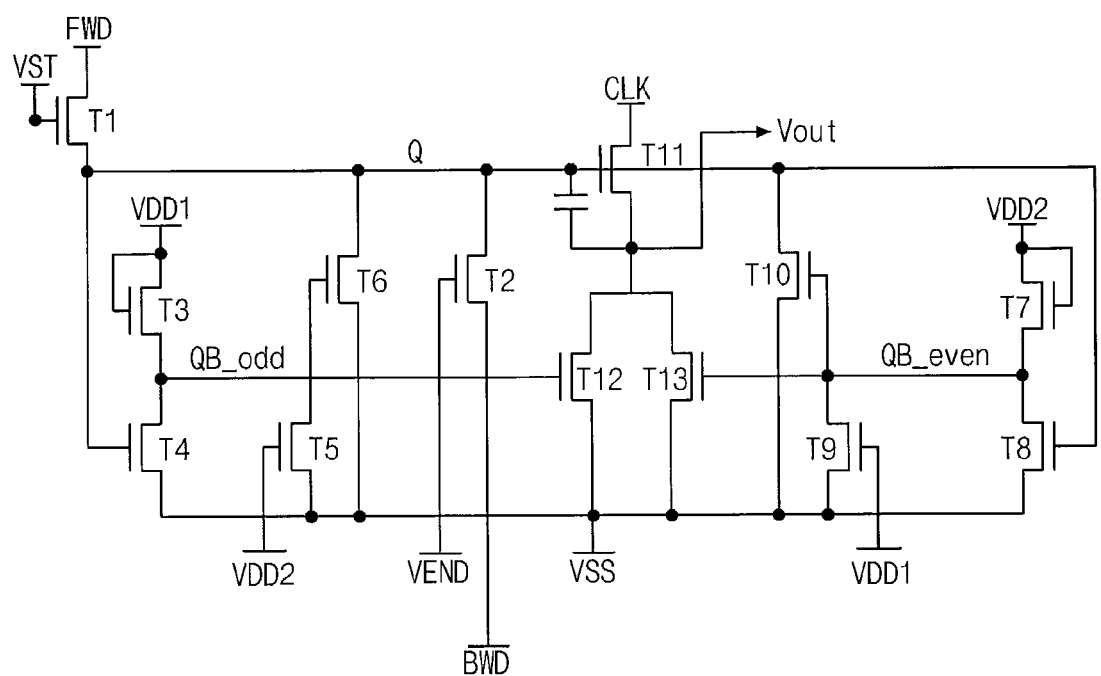
FIG. 4 is a diagram illustrating an example detailed configuration of each stage of FIG. 3.

Each of the stages 210, as illustrated in FIG. 4, includes a plurality of transistors T1 to T10 that may charge or discharge the voltages of the nodes Q and QB in response to a carry signal VST inputted from a previous stage, a carry signal VEND inputted from a next stage, and the gate clock CLK.

Each stage 210 includes a pull-up transistor T11 and two pull-down transistors T12 and T13 that output the scan signal Vout, including a pull-up signal and a pull-down signal, according to the voltages of the nodes Q and QB. Here, the pull-up signal may be a gate high voltage (VGH), and the pull-down signal may be a gate low voltage (VGL). In other words, the pull-up signal is the gate high voltage (VGH) that turns on the switching transistors connected to each gate line, and the pull-down signal is the gate low voltage (VGL) that turns off the switching transistors.

For example, each stage 210 includes the node Q for controlling the pull-up transistor T11, a node QB_odd for controlling the first pull-down transistor T12, and a node QB_even for controlling the second pull-down transistor T13.

When the pull-up signal is not inputted to a gate line, each stage 210 continuously outputs the pull-down signal, which is for turning off corresponding switching transistors, to the gate line.

In FIG. 4, each stage according to an embodiment of the present disclosure is illustrated as including a plurality of N-type thin film transistors, but is not limited thereto. Each stage according to an embodiment of the present disclosure may include a plurality of P-type thin film transistors, in which case each stage may be driven in the same scheme as that of FIG. 4. However, a voltage for turning on the P-type thin film transistor has a polarity opposite to a voltage for turning on the N-type thin film transistor.

Each stage 210 outputs the pull-up signal to a corresponding gate line during an image output period for each frame. After the pull-up signal is output during the image output period, the pull-down signal is output to the gate line by turning on one of the first and second pull-down transistors T12 and T13 included in each stage 210, and, during a touch sensing period for each frame, the pull-down signal is outputted to the gate line by turning on the other transistor of the first and second pull-down transistors T12 and T13 which is not turned on during the image output period.

For example, during the image output period, the pull-up signal is outputted to the switching transistors connected to each gate line during one horizontal synchronous period in the image output period, thereby displaying an image. Also, after the one horizontal synchronous period, during the other period in the image output period, the first and second driving voltages VDD1 and VDD2 having opposite polarities are respectively inputted to the first and second pull-down transistors T12 and T13. Therefore, the first pull-down transistor T12 is turned on, and the second pull-down transistor T13 is turned off, thereby outputting the pull-down signal.

Moreover, during the touch sensing period, the first and second driving voltages VDD1 and VDD2 having opposite polarities are respectively inputted to the first and second pull-down transistors T12 and T13. Therefore, the first pull-down transistor T12 is turned off, and the second pull-down transistor T13 is turned on, thereby outputting the pull-down signal.

In other words, in each stage 210, one of the two pull-down transistors is driven only during the image output period, and the other is driven only during the touch sensing period.

Hereinafter, a detailed description of each stage will be made with reference to FIGS. 4 and 5.

Figure 5:
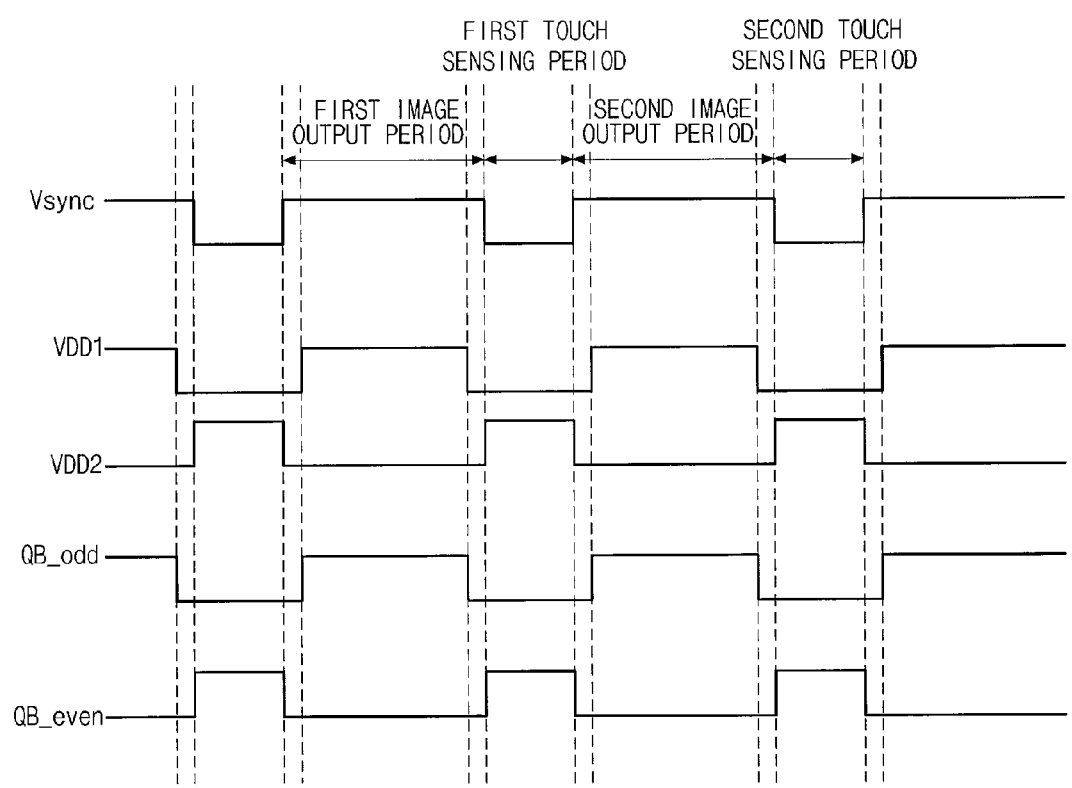
FIG. 5 is an example timing chart for describing an operation of each of a pull-up transistor and first and second pull-down transistors included in each stage of FIG. 4.

FIG. 5 is a timing chart for describing an operation of each of the pull-up transistor and first and second pull-down transistors included in each stage of FIG. 4.

Each stage 210 according to embodiments of the present disclosure generates the pull-down signal inputted to each gate line by using the two driving voltages VDD1 and VDD2 and the two pull-down transistors T12 and T13. In each frame, each stage 210 turns on the first pull-down transistor T12 to output the pull-down signal during the touch sensing period, and, during the image output period, each stage 210 turns on the second pull-down transistor T13 to output the pull-down signal.

In an embodiment, the polarity of the first driving voltage VDD1 for turning on the first pull-down transistor T12 and the polarity of the second driving voltage VDD2 for turning on the second pull-down transistor T13 may be alternately changed whenever the image output period and the touch sensing period are switched therebetween.

For example, as illustrated in FIG. 5, the polarity of the first driving voltage VDD1 is alternately changed from a high level to a low level in a first image output period, a first touch sensing period, a second image output period, and a second touch sensing period, and the polarity of the second driving voltage VDD2 is alternately changed from a low level to a high level in the first image output period, the first touch sensing period, the second image output period, and the second touch sensing period.

In an embodiment, the first driving voltage VDD1 for turning on the first pull-down transistor T12 and the second driving voltage VDD2 for turning on the second pull-down transistor T13 may have opposite polarities in each of the image output period and the touch sensing period.

For example, as illustrated in FIG. 5, during the first image output period, the first driving voltage VDD1 has a high level, and the second driving voltage VDD2 has a low level. During the first touch sensing period, the first driving voltage VDD1 has a low level, and the second driving voltage VDD2 has a high level. That is, it can be seen that the polarity of the first driving voltage VDD1 is opposite to that of the second driving voltage VDD2.

To describe the operation of each stage 210 according to embodiments of the present disclosure in time order, as illustrated in FIGS. 4 and 5, during the first image output period in one frame divided by the vertical synchronous signal Vsync, the first driving voltage VDD1 inputted to the first pull-down transistor T12 has a high level, and the second driving voltage VDD2 inputted to the second pull-down transistor T13 has a low level. Therefore, the voltage of the node QB_odd is changed to a high level. and only the first pull-down transistor T12 is turned on. After the first pull-down transistor T12 is turned on, a plurality of switching transistors connected to a corresponding gate line are turned off by applying a low-level power voltage VSS to the gate line. Here, the low-level power voltage VSS corresponds to the pull-down signal, and is the same as the gate low voltage (VGL).

Subsequently, after the first image output period, during the first touch sensing period, the first driving voltage VDD1 inputted to the first pull-down transistor T12 has a low level, and the second driving voltage VDD2 inputted to the second pull-down transistor T13 has a high level. Therefore, the voltage of the node QB_even is changed to a high level and only the second pull-down transistor T13 is turned on. After the second pull-down transistor T13 is turned on, the low-level power voltage VSS is outputted as the pull-down signal to a corresponding gate line.

Subsequently, during the second image output period and the second touch sensing period in a next frame, the operation of each stage (which has been previously performed during the first image output period and the first touch sensing period) is repeated. Such an operation is repeated for each frame.

Accordingly, one of the two pull-down transistors included in each stage of the gate driver according to the embodiments of the present disclosure operates only during the image output period, and the other operates only during the touch sensing period, thus preventing shaking of the touch signal due to characteristic differences between the pull-down transistors. When the touch signal is shaken during the touch sensing period, accuracy of touch sensing is reduced. Therefore, accuracy of touch sensing is enhanced by preventing the shaking of the touch signal.

It will be apparent to those skilled in the art that various modifications and variations can be made in a display device of the present disclosure without departing from the sprit or scope of the disclosure. Thus, it is intended that the present disclosure covers the modifications and variations of this disclosure provided they come within the scope of the appended claims and their equivalents.

What is claimed is:

1. A method of driving a display device with an integrated touch screen, the method comprising:
   providing a gate driver in the display device with the integrated touch screen, wherein the gate driver comprises a plurality of stages that comprises a pull-up transistor and first and second pull-down transistors and are respectively connected to a plurality of gate lines;
   turning on the pull-up transistor to output a pull-up signal to each of the plurality of gate lines;
   turning on the first pull-down transistor to output a pull-down signal to each of the plurality of gate lines during an image output period in each frame after the pull-up signal is outputted; and
   turning on the second pull-down transistor to output the pull-down signal to each of the plurality of gate lines during a touch sensing period in each frame after the pull-up signal is outputted.

2. The method of claim 1, wherein the pull-up signal and the pull-down signal have different polarities during the image output period and the touch sensing period in each frame.

3. The method of claim 1, further comprising:
   after one horizontal synchronous period, outputting a first and second driving voltages having opposite polarities respectively to the first and second pull-down transistors during the image output period.

4. The method of claim 3, further comprising:
   outputting the first and second driving voltages having opposite polarities respectively to the first and second pull-down transistors and outputting the pull-down signal during the touch sensing period.

5. The method of claim 4, further comprising:
   alternately changing the polarity of the first driving voltage for turning on the first pull-down transistor and the polarity of the second driving voltage for turning on the second pull-down transistor whenever the image output period and the touch sensing period are switched during each frame.

6. The method of claim 1, further comprising:
   during the image output period, turning on the first pull-down transistor before a plurality of switching transistors connected to a corresponding gate line are turned off by applying a low-level power voltage VSS to the gate line, wherein the low-level power voltage VSS corresponds to the pull-down signal.

7. The method of claim 1, further comprising:
   during the touch sensing period, turning on the second pull-down transistor before a low-level power voltage VSS is outputted as the pull-down signal to a corresponding gate line.

8. A display device with an integrated touch screen, comprising:
   a panel comprising a built-in touch screen;
   a gate driver provided in the panel, comprising a plurality of stages that comprises a pull-up transistor and first and second pull-down transistors and are respectively connected to a plurality of gate lines, the gate driver configured to sequentially output a pull-up signal to the plurality of gate lines during an image output period in each frame;
   a touch sensing unit driving the touch screen to determine whether there is a touch during a touch sensing period in each frame; and
   a display driver outputting a first and second driving voltages for controlling an output of the gate driver,
   wherein:
   during the image output period, each of the stages turns on the pull-up transistor to output the pull-up signal to a corresponding one of the plurality of gate lines and turns on the first pull-down transistor to output a pull-down signal to the plurality of gate lines with the first driving voltage after the pull-up signal is outputted, and
   during the touch sensing period, each stage turns on the second pull-down transistor to output the pull-down signal to a corresponding one of the plurality of gate lines with the second driving voltage.

9. The display device of claim 8, wherein the pull-up signal and the pull-down signal have different polarities during the image output period and the touch sensing period in each frame.

10. The display device of claim 8, wherein each of the stages outputs the pull-up signal to a switching transistor connected to each gate line during a horizontal synchronous period in the image output period and displaying an image.

11. The display device of claim 8, wherein each of the stages outputs the first and second driving voltages having opposite polarities respectively to the first and second pull-down transistors after the one horizontal synchronous period during the image output period.

12. The display device of claim 11, wherein each of the stages outputs the first and second driving voltages having opposite polarities respectively to the first and second pull-down transistors and outputting the pull-down signal during the touch sensing period.

13. The display device of claim 8, wherein each of the stages alternately changes the polarity of the first driving voltage for turning on the first pull-down transistor and the polarity of the second driving voltage for turning on the second pull-down transistor whenever the image output period and the touch sensing period are switched.

14. The display device of claim 8, wherein each of the stages turns on the first pull-down transistor when a plurality of switching transistors connected to a corresponding gate line are turned off by applying a low-level power voltage VSS to the gate line during the first image output period.

15. The display device of claim 14, wherein the low-level power voltage VSS corresponds to the pull-down signal.

16. The display device of claim 8, wherein each of the stages turns on the second pull-down transistor when a low-level power voltage VSS is outputted as the pull-down signal to a corresponding gate line during the first touch sensing period.

17. A method of driving a display device with an integrated touch screen, comprising:
providing a gate driver in the display device with the integrated touch screen, wherein the gate driver is connected to a plurality of gate lines;
outputting a pull-up signal to each of the plurality of gate lines;
outputting a pull-down signal to each of the plurality of gate lines through a first pull-down transistor during an image output period in each frame after the pull-up signal is outputted; and
outputting the pull-down signal to each of the plurality of gate lines through a second pull-down transistor during a touch sensing period in each frame after the pull-up signal is outputted.

18. The method of claim 17, wherein the pull-up signal and the pull-down signal have different polarities during the image output period and the touch sensing period in each frame.

* * * * *